United States Patent
Harris

(10) Patent No.: US 8,418,891 B1
(45) Date of Patent: Apr. 16, 2013

(54) POWERED DISPENSER WITH INTERCHANGEABLE CARTRIDGES

(75) Inventor: Tami Lynn Harris, Sacramento, CA (US)

(73) Assignee: Edison Nation, LLC, Charlotte, NC (US)

( * ) Notice: Subject to any disclaimer, the term of this patent is extended or adjusted under 35 U.S.C. 154(b) by 20 days.

(21) Appl. No.: 13/134,078

(22) Filed: May 27, 2011

Related U.S. Application Data

(63) Continuation-in-part of application No. 12/002,960, filed on Dec. 19, 2007, now Pat. No. 7,950,549.

(51) Int. Cl.
*B65D 88/54* (2006.01)

(52) U.S. Cl.
USPC .................. 222/333; 222/63; 222/386

(58) Field of Classification Search .......... 222/333, 222/323–327, 504, 505, 258, 261–263, 63, 222/626, 386, 391
See application file for complete search history.

(56) References Cited

U.S. PATENT DOCUMENTS

| | | | |
|---|---|---|---|
| 2,102,939 A | 12/1937 | Bishop | |
| 2,115,591 A | 4/1938 | Sherbondy | |
| 3,208,638 A | 9/1965 | Frenzel et al. | |
| 4,258,864 A | 3/1981 | Karamanolis | |
| 4,869,403 A | 9/1989 | Bruning | |
| 5,137,184 A | 8/1992 | Jackson et al. | |
| 5,361,946 A | 11/1994 | Ginther et al. | |
| 5,405,050 A | 4/1995 | Walsh | |
| 5,556,009 A * | 9/1996 | Motzko | 222/326 |
| D393,574 S | 4/1998 | Perkins | |
| 5,980,144 A | 11/1999 | Debourg | |
| 6,026,985 A | 2/2000 | Elliott, Sr. | |
| 6,047,858 A | 4/2000 | Romer | |
| 6,101,968 A | 8/2000 | Fitzgibbons | |
| 6,152,333 A | 11/2000 | Binder | |
| 6,273,302 B1 | 8/2001 | Formaro | |
| 6,460,481 B1 | 10/2002 | Young | |
| 6,460,731 B2 | 10/2002 | Estelle | |
| 6,616,448 B2 * | 9/2003 | Friedman | 433/32 |
| 6,619,508 B2 * | 9/2003 | Balcome et al. | 222/136 |
| 6,889,872 B2 * | 5/2005 | Herman et al. | 222/82 |
| 6,968,873 B1 | 11/2005 | Cariddi | |
| 7,451,900 B2 | 11/2008 | Hornsby et al. | |
| 7,690,530 B2 | 4/2010 | Schneider et al. | |
| 7,997,822 B2 * | 8/2011 | Rosner et al. | 401/263 |
| 8,020,727 B2 * | 9/2011 | Herman et al. | 222/1 |
| 2002/0095998 A1 * | 7/2002 | Kriz et al. | 73/864.18 |
| 2007/0267438 A1 * | 11/2007 | Wijerama | 222/101 |
| 2008/0041880 A1 * | 2/2008 | Babineau et al. | 222/146.5 |
| 2010/0001017 A1 | 1/2010 | Herman et al. | |

* cited by examiner

*Primary Examiner* — Lien Ngo
(74) *Attorney, Agent, or Firm* — Tillman Wright, PLLC; James D. Wright; David R. Higgins

(57) ABSTRACT

An electric or battery powered dispenser comprising a multi-mode motor control system comprising a plurality of different user selected dispensing control modes for dispensing a wide variety of semi-soft materials. The powered dispenser is held in one hand and dispenses the material in accordance with a user selected one of the plurality of different user selected dispensing control modes. The powered dispenser features a quick-change cartridge system, which allows the user to quickly and easily change cartridges, which can be refilled or pre-filled with the material of the user's choice, without having to clean out the barrel. The dispenser can be used in many applications such as cake decorating, craft applications, woodworking, and construction.

9 Claims, 12 Drawing Sheets

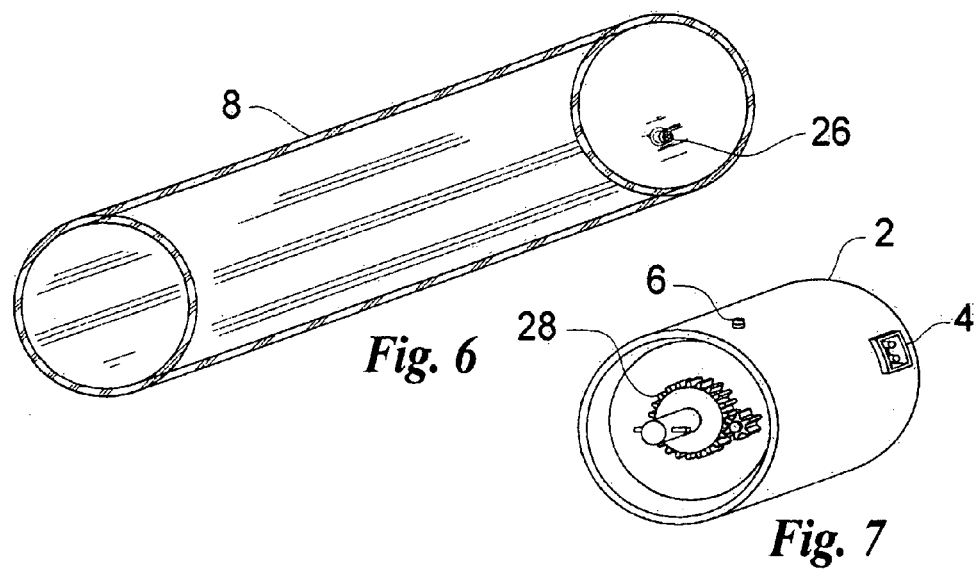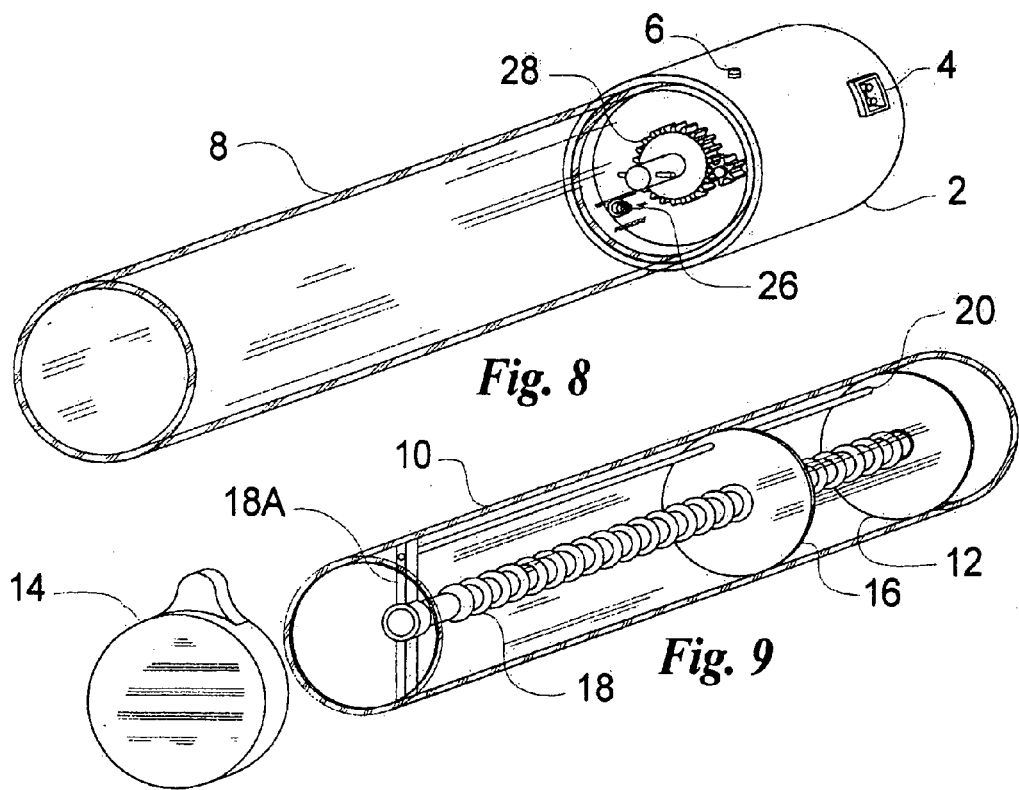

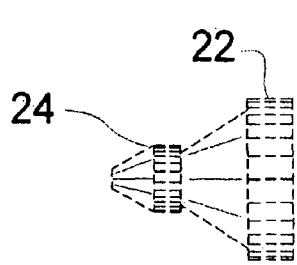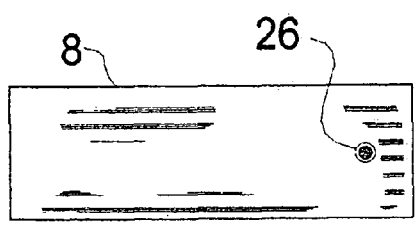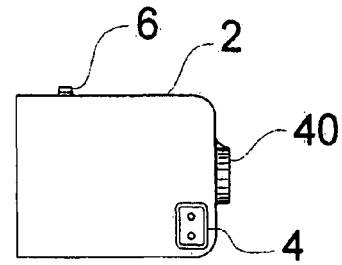
Fig. 13　　　Fig. 14　　　Fig. 15
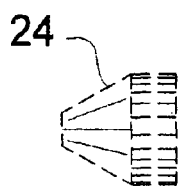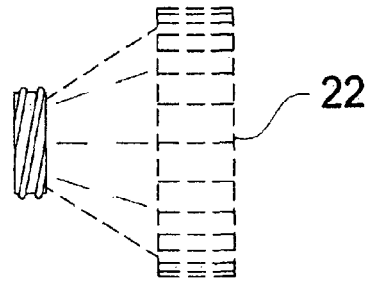
Fig. 16　　　Fig. 17
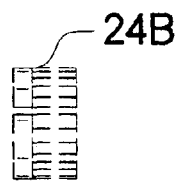
Fig. 18
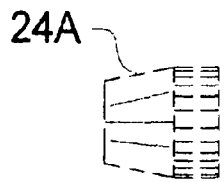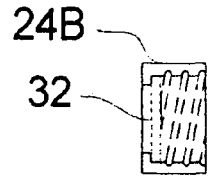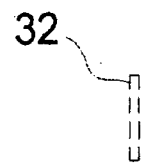
Fig. 19　　Fig. 20　　Fig. 21　　Fig. 22

POWERED DISPENSER WITH INTERCHANGEABLE CARTRIDGES

CROSS-REFERENCE TO RELATED APPLICATIONS

This application is a continuation-in-part patent application of U.S. patent application Ser. No. 12/002,960, filed Dec. 19, 2007, issued May 31, 2011 as U.S. Pat. No. 7,950,549 and which is hereby incorporated by reference herein in its entirety.

FIELD OF THE INVENTION

This invention relates generally to an electric or battery powered hand tool, which dispenses a wide variety of semi-soft materials, and, in particular, to a hand held electric or battery powered dispenser with an interchangeable cartridge system and a multi-mode motor control system comprising a plurality of different user selected dispensing control modes for dispensing a wide variety of semi-soft materials in accordance with a user selected one of the plurality of different user selected dispensing control modes.

BACKGROUND OF THE INVENTION

In the prior art U.S. Pat. No. 6,460,481 (Young) discloses a cake decorator that has an axial cylinder and a powered piston controlled by twisting an axial rotary actuator switch in one direction or another.

U.S. Pat. No. 6,047,858 (Romer) discloses a device for applying frosting or icing to a cake or pastry from a cartridge containing pastry dough, frosting or icing. The device has a walled cartridge container and a hand-held gun for dispensing pastry dough, icing or frosting. The device consists of a tube defining side walls of a compressed air chamber, a cap is arranged to seal an end of the tube and define a top of the compresses air chamber. A plunger rod is disposed within the tube. A sealing washer is connected to the rod to provide an air seal with an inside surface of the tube, the sealing washer defining a lower wall of compressed air chamber. Inlet in the cap or tube located to allow air into compressed air chamber. Valve structure associated with air inlet for controlling the air pressure in the compressed air chamber. A container lid connected to a lower portion of the tube the plunger rod extending through the lid. A container body having an opening that seals with container lid and a container outlet in a portion opposite the opening. A hand held gun having a gun valve for dispensing pastry dough, icing or frosting. A hose connecting the container outlet to the gun. A finger trigger of the hand-held gun connected to gun valve whereby when pastry dough, frosting or icing is in the container body the finger trigger is activated, the gun valves open allowing the flow of pastry, dough or icing.

U.S. Pat. No. 6,101,968 (Fitzgibbons, et al.) discloses a motor and gear train driven by the motor, the train adapted to selectively engage a gear rack secured to the compression element to drive it down to squeeze the collapsible frosting container. When the train has moved into engagement, it closes a switch activating the motor.

U.S. Pat. No. 6,152,333 (Binder) discloses an apparatus for extrusion and metered delivery of free-flowing substances, having a housing having a receiving space, openable at least on one side, for a disposable material package having an expulsion nozzle with a compressed-air connection and having, on the side opposite the expulsion nozzle, a piston that is displaceable in the direction of the expulsion nozzle in the receiving space or in the disposable material package, and pushes the substance ahead of it and thereby ejects it from the expulsion nozzle, compressed air being fed from the compressed-air connection to the side of the piston facing away from the expulsion nozzle.

U.S. Pat. No. 6,026,985 (Elliott) discloses a food dispenser gun, comprising a tube holding a quantity of an extrudable food product, a piston sealingly engaged with an interior of the tube, a rod coupled to the piston and an incremental dispenser engaged with the rod and the tube, the incremental dispenser comprising a trigger, or an advancement lever operable to move the rod in a first direction relative to the incremental dispenser in response to the trigger and a retrograde lock operable to prevent the rod from moving in a second direction, wherein the advancement lever and the retrograde lock are completely enclosed by a housing of the incremental dispenser.

U.S. Pat. No. 5,405,050 (Walsh) discloses an apparatus for dispensing viscous fluids, such as adhesives, sealants, caulks is actuated by an electromagnetic coil assembly in conjunction with a magnet mounted to a plunger. Energizing the coil assembly produces an electromagnetic field which cooperates with the magnetic field to cause the plunger to open. Closing results from reversing the electromagnetic field.

U.S. Pat. No. 4,258,864 (KARAMANOLIS) discloses an automatic toothpaste dispenser employs a roller-type squeeze device that is driven along the toothpaste tube simultaneously with the opening of a gate that permits the toothpaste to flow. After the desired amount of toothpaste has been dispensed, the roller is automatically retracted and the gate is simultaneously closed. However, the retraction of the gate only continues until the gate is closed, which results in a ratchet-like effect, the roller being retracted a smaller distance than that by which it is advanced.

U.S. Pat. No. 5,980,144 (DEBOURG) discloses a hand held dispenser for thermoplastic material including a casing forming a manual holding element and enclosing a space for receiving a mass of thermoplastic material in a solid state, the casing having an open outlet end communicating with the space; a component for advancing the thermoplastic material toward the open end of the casing, and a heating element for heating the thermoplastic material to a flowable state, wherein the heating element has a low thermal inertia, is arranged in a substantially homogeneous manner across a surface disposed opposite the open end and having dimensions which correspond to dimensions of the open end and wherein the heating element further acts to distribute thermoplastic material in a flowable state in the form of a sheet on a receiving surface.

U.S. Pat. No. 6,460,731 (ESTELLE) discloses an electrically operated fluid dispenser for dispensing a pattern of viscous fluid onto a substrate during a run mode. The dispenser is turned off and does not dispense the viscous fluid during a standby mode of operation. The dispenser includes a dispenser body having an outlet and an armature disposed in the dispenser body for movement between an opened position allowing a fluid flow from the outlet and a closed position preventing the fluid flow from the outlet. A coil is mounted adjacent the armature and selectively generates an electromagnetic field for moving the armature between the opened and closed positions. A controller includes different apparatus and methods for using the coil as a heater as well as providing other heat transfer devices on the dispensing valve to maintain a constant temperature either, during only the run mode or, during both, the run and the standby modes.

U.S. Pat. No. 6,968,873 (CARIDDI) shows a bagel or pastry filling device attachable to one end of a standard and well-known pastry filling or cake decorating gun. The inventive concept combines a bent piece of tubing made from any suitable material wherein one end has a sharp edge which is insertable into a bagel, donut, piece of pastry, and whose other end is inserted into a funnel where it is held in place by means of an insert placed inside the flared opening of the funnel which, while usually made of plastic, may be made of any suitable material. The pastry filling attachment is then inserted into a nut, usually made of plastic, which in turn engages a length of plastic tubing having external male threads.

U.S. Pat. No. 3,935,74 (Perkins) shows a pastry extruder. The extruder uses a manually operated trigger to move the plunger inside the barrel of the dispenser. The dispensable material is contained inside the barrel of the dispenser. If the user wants to change dispensable materials they must clean out the barrel before reloading with the new material.

BRIEF SUMMARY OF THE INVENTION

In one embodiment, the powered dispenser of the present invention comprises a rigid plastic tube (the barrel), with an interchangeable tip coupler on one end, and a variable speed electric motor on the other end. The couplers are interchangeable and are held in place by a threaded ring (coupler ring), which is removed to change the coupler, and to load a cartridge into the barrel.

In one embodiment, the cartridge is pre-filled with a material to be dispensed and is loaded into the barrel by removing the coupler ring, allowing access to the opening in the barrel. The cartridge is inserted into the barrel and pushed onto the motor in the base to secure. Then, the appropriate coupler is inserted into the coupler ring and screwed back on to the open end of the barrel. A rubber gasket, resting inside a groove in the coupler ring, secures the open end of the cartridge to prevent leakage into the barrel.

In one embodiment, the couplers, available in a variety of sizes, also have a threaded ring (the tip ring), which secures a desired dispensing/decorating tip of the user's choice. A large coupler is mounted to hold larger tips, and a smaller coupler to hold standard sized tips. The user can easily change the dispensing/decorating tip according to their need, by unscrewing the tip ring and inserting a new tip.

In one embodiment, a pressure sensitive flow-control button is located near the tip end of the barrel and is attached to the variable speed motor. The motor's speed, power, and direction (clockwise and counterclockwise) are controlled by a dial located at the end of the barrel's motor housing. The motor control dial allows the user to change the motor speed and power according to the consistency of the product to be dispensed and the desired flow of the material. The motor also has a forward and reverse (clockwise and counter-clockwise) setting. In another embodiment, the motor's speed, power, and direction are controlled by a multi-mode motor control system having a user interface module at the end of the barrel's motor housing. The user interface module allows the user to change the motor speed and power according to the consistency of the product to be dispensed and the desired flow of the material.

The barrel is held in one hand (as if it were a pencil). A variation of the design would use a rechargeable lithium-ion battery housed in a pistol grip, located at the tip end of the barrel. On this design the flow-control button would be a trigger-type button located on the pistol grip. The pressure sensitive flow-control button (or trigger) is pressed to activate the variable speed motor in the base. The motor drives a rubber-ringed plunger down a threaded rod, through the cartridge, pushing the material to be dispensed out through the tip.

Depending on the model used, the cartridges can be purchased pre-filled with a wide variety of semi-soft products such as cake frosting, caulking, adhesives, semi-soft polymer clay, et cetera. The cartridges are reusable and/or disposable, and come with a removable seal to keep the product from drying out. In another embodiment, empty cartridges may also be purchased so that the user may fill them with their own frosting recipe, or for polymer clay artists who want to mix their own colors.

In one embodiment, the cartridge is a rigid plastic tube, open on one end (the dispensing end) and sealed by an end-cap on the other end (the cartridge base). A hole in the end cap allows a threaded rod or screw, which runs the length of the cartridge, to turn freely. The threaded rod is mounted onto a gear at the cartridge base. The gear is fitted with a female coupler, which is seated into a male motor connection. A plunger is threaded and mounted onto the threaded rod in the cartridge. As the motor turns the threaded rod, the plunger is driven up (or down) the rod towards the tip end of the barrel. A guide rod, molded into the interior of the cartridge, provides a guide for the plunger to prevent the plunger from turning freely inside the cartridge. The guide rod forces the plunger up or down the threaded rod, depending on the direction of the motor. A notch cut into the edge of a rubber ring on the plunger, fits the guide rod securely and allows the plunger to slide on the guide rod as it travels up and down the threaded rod, without loss of material through the notch in the rubber ring. Once the cartridge is seated into the motorized base and the flow control button is activated the motor drives the plunger up the threaded rod, pushing the semi-soft material through the cartridge and out through the interchangeable tip. Once the cartridge is empty, a new or refilled cartridge is inserted into the barrel. To fill (or refill) an empty cartridge disposed in the barrel, the power is reversed to drive the plunger back toward the motor end of the cartridge. Once the plunger is in position at the base of the cartridge (the motor end) the cartridge may be removed and filled with a custom mixture of the user's choice.

As stated above the powered dispenser can be provided in different configurations. For example, the dispenser can either be of a pencil or pistol grip version, each dispensing a wide variety of dispensable materials, which is any semi-soft, for example, a frosting consistency material. The dispenser uses re-sealable cartridges containing dispensable of the users choice, depending on the model/application. Cartridges are reusable (you can clean and refill empty cartridges) and recyclable. It is proposed to sell empty cartridges (cartridge blanks) such that they can be filled with a dispensable material of a user's choice.

The motor housing and wiring housing (for the button and trigger, and the reverse buttons) may contain an access panel for servicing motor and wiring. The dispenser is made of durable, ridged hard plastic. It may be preferable for the barrel of the dispenser to be completely transparent. An alternative to an all transparent barrel is a transparent viewing window running the length of the barrel.

In one embodiment, the motor housing is permanently affixed to the barrel and the cartridge gear at the base of the cartridge and the threaded plunger drive rod are affixed to each other so that when the motor turns the cartridge gear, the threaded plunger drive rod also turns at the same rate. Additionally, and in one embodiment, the rubber-ringed plunger is a plastic disk, which rides on a threaded carriage up and down the threaded plunger drive rod. This plastic disk may also have a rubber ring (gasket) around the edge to prevent leakage into the cartridge barrel and if so, the rubber ring has a notch to fit snugly against the molded guide rod to prevent leakage of the dispensable into the barrel of the cartridge. Furthermore, and in one embodiment, the molded guide rod inside the cartridge is plastic and is molded inside each cartridge. This rod prevents the cartridge plunger from turning in place, forcing the plunger up or down the cartridge, depending on the direction of the motor (clockwise or counter-clockwise).

An alternative design to eliminate the need for the molded guide rod and the notch in the plunger (and the notch in the rubber-ring on the plunger) would be to make the dispenser and cartridge barrel slightly oval shaped instead of round. The oval shape would serve the function of the guide rod in that it would force the plunger up (or down) the barrel of the cartridge. Without some method of forcing the plunger up or down the barrel, the plunger would simply turn in place and not travel up or down the threaded plunger drive rod.

In light of the above, and in one aspect, an embodiment of the invention provides an electric or battery powered dispenser, which dispenses a wide variety of semi-soft materials by pressing a pressure sensitive flow-control button wherein the power of the dispenser is adjustable, depending upon the consistency of the product to be dispensed.

In another aspect, an embodiment of the invention provides a dispenser comprising a quick-change cartridge system, which allows the user to quickly and easily change cartridges, which are pre-filled with the material of the user's choice, without having to clean out the barrel.

In another aspect, an embodiment of the invention provides a powered dispenser that can be used for a number of applications, depending on the model and the material to be dispensed. For example the dispenser can be used in cake decorating with a model that dispenses frostings in a wide variety of colors, flavors, and consistencies, or construction/woodworking to dispense caulking and adhesives and in crafts to dispense a semi-soft, bake-able polymer clay compound in a wide variety of colors or many other applications. In cake decorating, for example, a user is be able to change frosting colors or flavors, quickly and easily by replacing the frosting cartridge with a new color or flavor cartridge, eliminating the need to clean out the barrel with each color or flavor change. The cake decorator's model may also include a cookie press accessory, and a more powerful "Cookie Dough" setting on the motor control dial or user interface, which allows for a firmer consistency product, like cookie dough, to be dispensed.

In another aspect, an embodiment of the invention provides a powered dispenser that can be variable in size, construction materials, and motor strength, depending on the application. The Construction/Woodworker's model for example would be made of much more rugged and durable materials, for indoor and outdoor use, than the Crafter's model or the Cake Decorator's model, which are intended for indoor use only.

In another aspect, an embodiment of the invention provides a powered dispenser for dispensing semi-soft materials, the powered dispenser comprising: a barrel with an interchangeable tip coupler on one end and a motor at the other end; a replaceable cartridge sized to be received within the barrel and to contain a semi-soft material to be dispensed; a threaded rod disposed inside the replaceable cartridge and connected to the motor; a plunger disposed inside the replaceable cartridge and mounted on the threaded rod wherein the plunger is driven along the threaded rod in an up or down direction through the replaceable cartridge depending on a direction that the motor turns the threaded rod; means for preventing the plunger from turning freely inside the replaceable cartridge, and a multi-mode motor control system for driving the motor as a function of a user selected mode wherein the multi-mode motor control system comprises a user interface comprising means for selecting between a plurality of different user selected dispensing control modes and wherein the plurality of different user selected dispensing control modes comprises a trigger actuated dispensing control mode, an auto continuous dispensing control mode, and a pulsed dispensing control mode.

In another aspect, an embodiment of the invention provides a powered dispenser for dispensing semi-soft materials, the powered dispenser comprising: a barrel having a motor at one end; a replaceable cartridge sized to be received within the barrel and to contain a semi-soft material; a plunger disposed inside the replaceable cartridge and operatively coupled to the motor wherein the plunger is driven in an up or down direction through the replaceable cartridge depending on a direction that the motor turns; a user interface comprising means for selecting between a plurality of different user selected dispensing control modes; and a controller operatively coupled to the motor and connected in signal communication with the user interface, the controller being configured to drive the motor for driving the plunger for dispensing the semi-soft material from an end of the replaceable cartridge opposite the motor in accordance with a user selected one of the plurality of different user selected dispensing control modes wherein the plurality of different user selected dispensing control modes comprises a trigger actuated dispensing control mode, an auto continuous dispensing control mode, and a pulsed dispensing control mode.

In a further aspect, an embodiment of the invention provides a non-transitory microcontroller-readable memory containing microcontroller-executable instructions that, when executed by a processor, cause the processor to perform a user selected dispensing mode of a multi-mode method for driving a motor for dispensing a semi-soft material, the multi-mode method comprising: receiving a user interface signal correlative to a user selection of one of a plurality of different user selected dispensing modes; and controlling operation of a motor operatively coupled to a plunger disposed within a cartridge containing semi-soft material for displacing the plunger in the cartridge in a first direction for dispensing the semi-soft material from the cartridge in accordance with the selected one of the plurality of different user selected dispensing modes. The non-transitory microcontroller-readable memory further comprising a step of responding to another user interface signal for reversing the motor for displacing the plunger in the cartridge in a second direction opposite the first direction for aspirating a portion of dispensed semi-soft material back into the cartridge prior to stopping the motor.

Accordingly, and before explaining at least one embodiment of the invention in detail, it is to be understood that the invention is not limited in its application to the details of construction and to the arrangements of the components set forth in the following detailed description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6 shows an isometric view of a cylinder of the invention.

FIG. 7 shows an isometric view of a motor of the invention.

FIG. 8 shows an isometric view of the cylinder and motor of the invention.

FIG. 9 shows an isometric view of a cartridge and end cap of the invention.

FIG. 13 shows a side view of an application tip coupled to an application tip retaining rim of the invention.

FIG. 14 shows a side view of the cylinder of the invention.

FIG. 15 shows a side view of the motor of the invention.

FIG. 16 shows a side view of the application tip of the invention.

FIG. 17 shows a side view of the application tip retaining rim of the invention.

FIG. 18 shows a side view of the thread of the application tip retaining rim.

FIG. 19 shows a side view of a decorator tip acceptor of the invention.

FIG. 20 shows an inside view of the thread of the application tip retaining rim.

FIG. 21 shows a side view of a decorating tip of the invention.

FIG. 22 shows a front view of a decorating tip of the invention.

DETAILED DESCRIPTION OF THE INVENTION

For purposes of clarity and brevity, like elements and components will bear the same designations and numbering throughout the figures.

Figure 1:
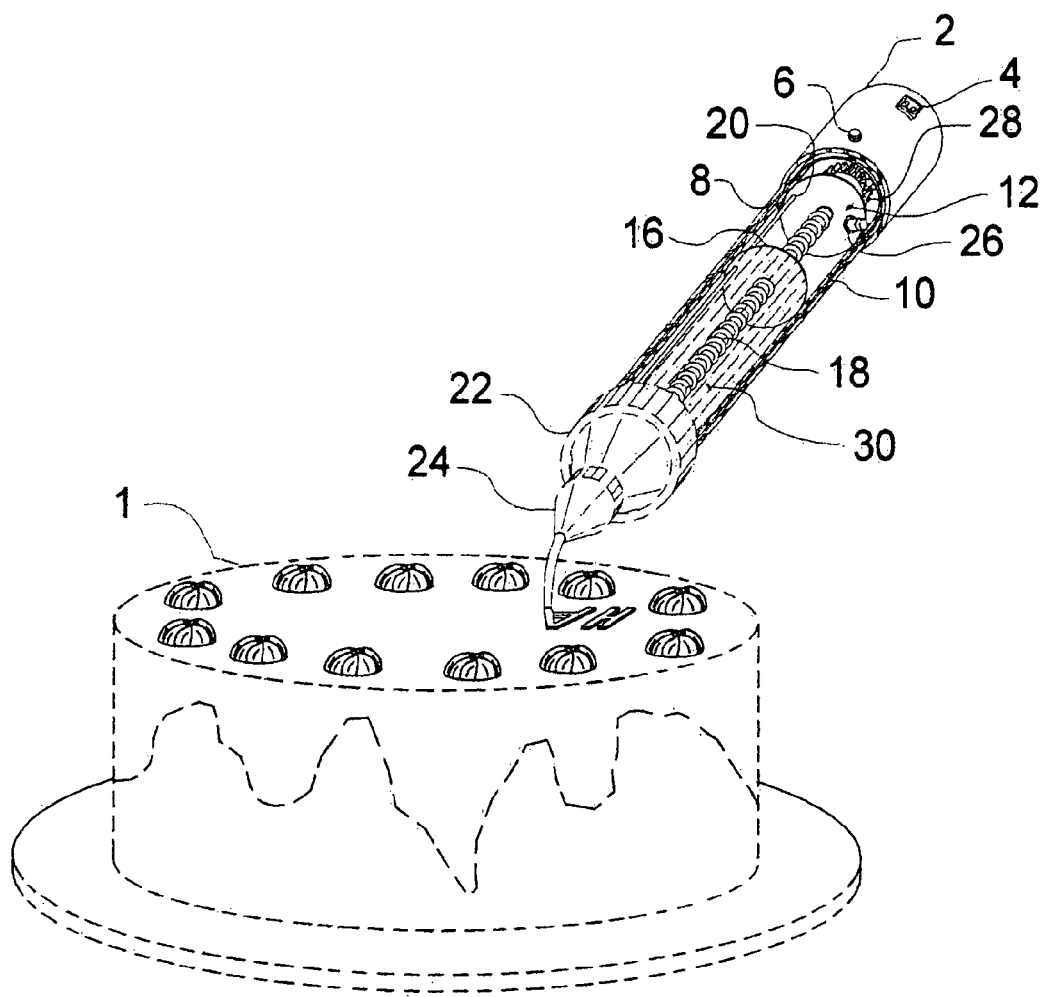
FIG. 1 shows an isometric view of a pencil grip embodiment of the invention used in a cake decorating application.
Figure 2:
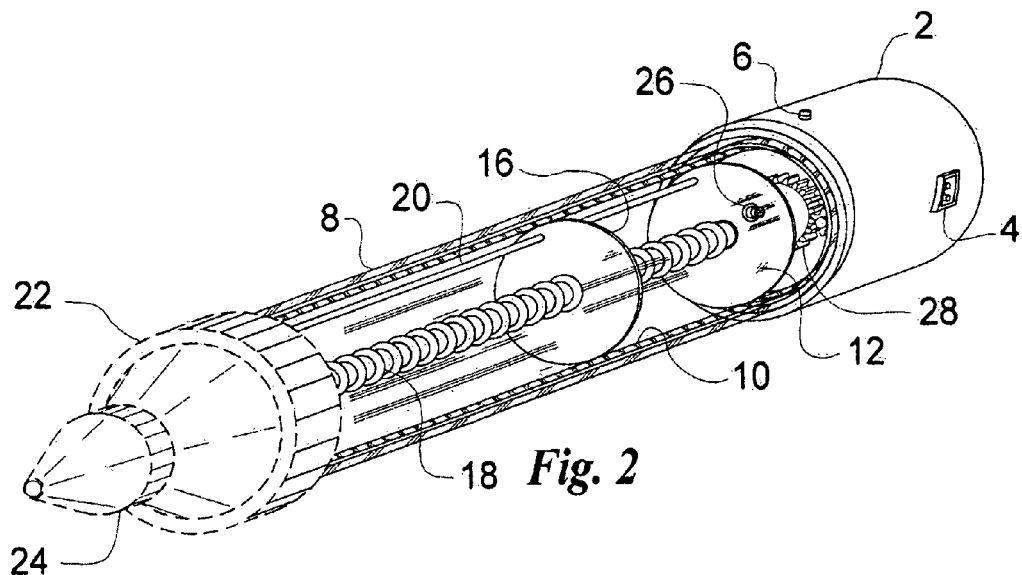
FIG. 2 shows an isometric view of the pencil grip embodiment of the invention.

FIG. 1 shows a pencil grip embodiment of the powered dispenser and how it is used in a cake decorating application. The cake is shown at 1. The powered dispenser comprises several components. At one end is an application tip 24, for example in this instance for bakery items, attached to an application tip retaining rim 22. Attached to 22 is a cylinder 8, which is preferably made of plastics, and has within it a plunger disc 16 which is supported on a guide rod 20 as it travels up and down a screw shaft 18. The screw shaft 18 is driven by a motor 2 via reduction gearing 28. This motor may contain a rechargeable battery that is charged via receptacle 4. A reverse switch 6 is also provided to drive the motor in the opposite direction. Inside the cylinder 8 is placed a plastic cartridge 10 which can be can be filled with icing, glue, adhesive, et cetera or any other semi-soft material for a particular application. The content of the cartridge 10 is shown at 30. Also shown in this figure is a top inside rim 12 of the cylinder 8 which prevents icing, glue, adhesive, et cetera entering the gear area and a pressure relief valve 26 which lets air not icing, glue, adhesive, et cetera out. FIG. 2 shows a similar view as FIG. 1 but without the cake 1.

Figure 3:
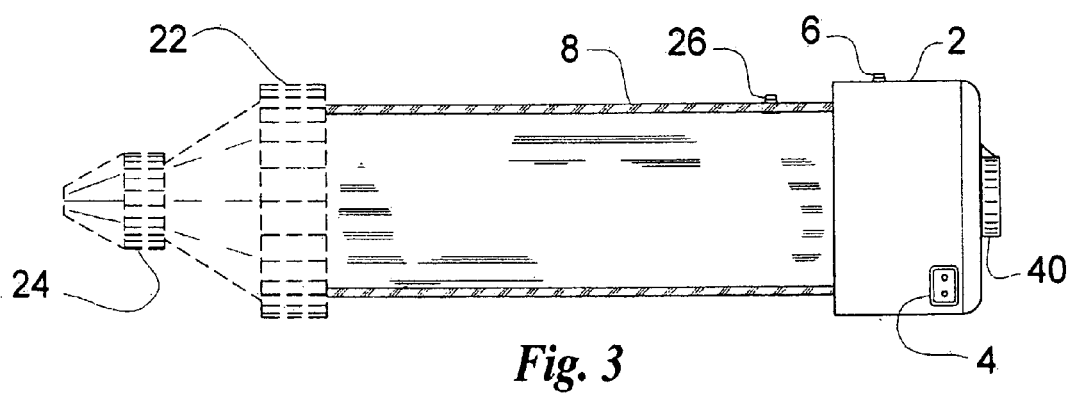
FIG. 3 shows a side view of the pencil grip embodiment of the invention.

FIG. 3 shows a side view of the invention but also shows a motor control switch 40 which is used to turn the invention on and off and also vary the speed.

Figure 4:
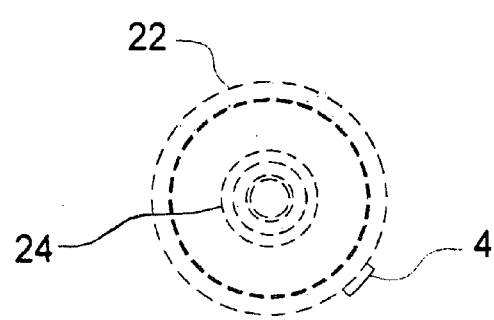
FIG. 4 shows a front view of the pencil grip embodiment of the invention.

FIG. 4 shows a front view of the invention, with the application tip 24 and the application tip retaining rim 22. This view also shows the battery recharging receptacle 4 protruding.

Figure 5:
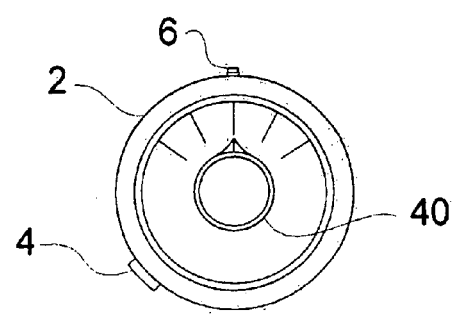
FIG. 5 shows a rear view of the pencil grip embodiment of the invention.

FIG. 5 shows one embodiment of a rear view of the invention with the motor control switch 40 used to switch the invention on and off and also adjust the speed. The control switch 40 in situated on the motor 2. This figure also shows the battery recharging receptacle 4 protruding and the reverse switch 6 which is used to change the direction of the motor 2.

FIG. 6 shows an isometric view of the cylinder 8 which is preferably made of a plastics material. The cylinder has a pressure relief valve 26 at one end that lets air but does not allow the semi-soft material being dispensed by the invention out.

FIG. 7 shows an isometric view of the motor 2 having reverse switch 6 which is used to change the direction of the motor 2 and the battery recharging receptacle 4. The motor drives a screw shaft (shown in FIG. 1) via reduction gears 28. FIG. 8 shows the cylinder shown in FIG. 6 and the motor shown in FIG. 2 together.

FIG. 9 shows an isometric view of the cartridge 10 and end cap 14 which is used to retain icing, glue or adhesive, et cetera or other semi-soft material used for a particular application. The cartridge 10 is filled with icing, glue or adhesive, et cetera or other semi-soft material used for a particular application. A screw shaft 18 passes through the center of the cartridge 10 having at one end a motor coupling 18A and a top inside rim 12 preventing icing, adhesives, glues, et cetera from entering the gear area of the motor. A plunger disc 16 moves along the cartridge 10 and is secured on a guide rod 20 as it travels up and down.

Figure 10:
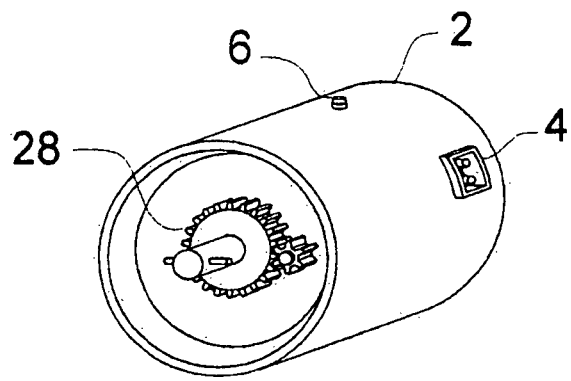
FIG. 10 shows an isometric view of an embodiment of a front of the motor.

FIG. 10 shows an isometric view of the motor 2 having reverse switch 6 which is used to change the direction of the motor 2 and the battery recharging receptacle 4. The motor drives the screw shaft 18 (shown in FIG. 1) via reduction gears 28.

Figure 11:
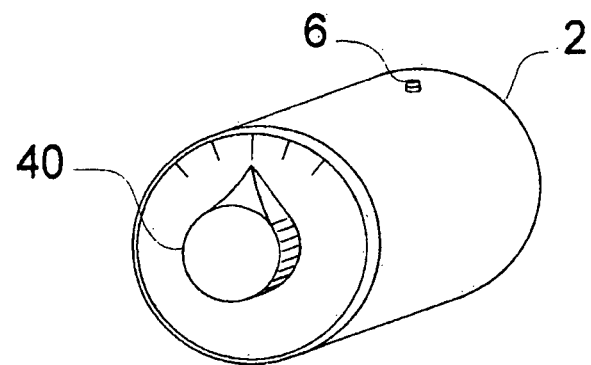
FIG. 11 shows an isometric view of an embodiment of a rear of the motor.
Figure 12:
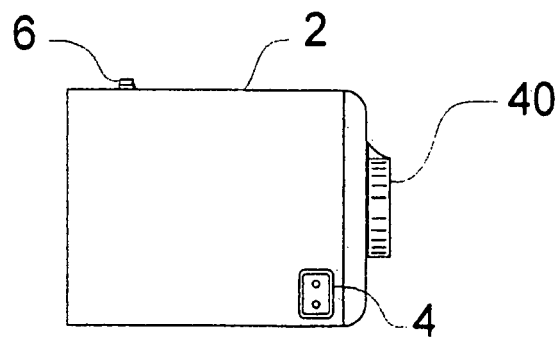
FIG. 12 shows a side view of the motor of the invention and an embodiment of a motor control switch.

FIG. 11 shows the motor control switch 40 used to switch the invention on and off and also adjust the speed. The switch 40 in situated on the motor 2. FIG. 11 also shows the reverse switch 6 which is used to change the direction of the motor 2. FIG. 12 shows a side view of the invention with the motor control switch 40 used to switch the invention on and off and also adjust the speed. The switch in situated on the motor 2. This figure also shows the battery recharging receptacle 4 protruding and the reverse switch 6 which is used to change the direction of the motor 2.

FIGS. 13, 14 and 15 respectively show a side view of the application tip 24 coupled to the retaining rim 22, the cylinder 8, and the motor 2 all which have been described previously.

FIGS. 16 and 17 respectively show a side view of the application tip 24 and the application tip retaining rim 22 which are shown separated and are connected by a screw-type thread.

FIG. 18 shows a side view of a thread section 24B. FIG. 19 shows a side view of a decorator tip acceptor 24A. FIG. 20 shows an inside view of the thread section 24B with a decorating tip (for a bakery application) 32. FIG. 21 shows a side view of the decorating tip 32. FIG. 22 shows a front view of the decorating tip 32.

Figure 23:
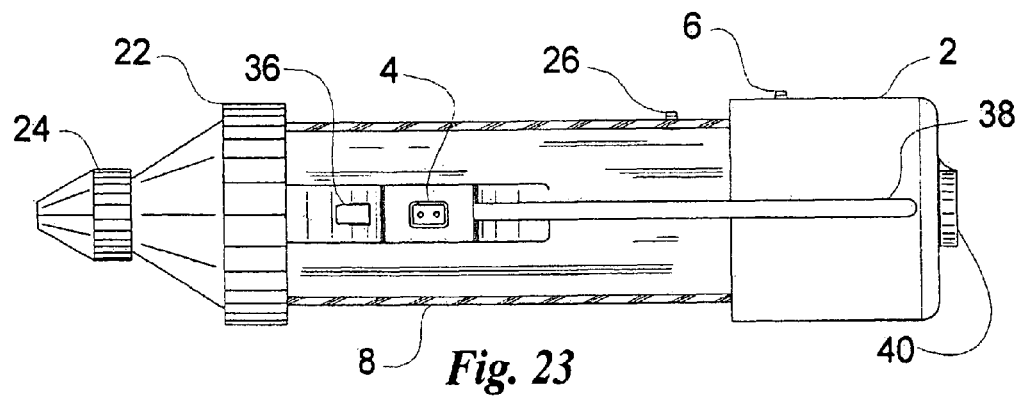
FIG. 23 shows a bottom view of an embodiment of the invention.

FIG. 23 shows a bottom view of the invention with application tip 24 threadedly coupled to the application tip retaining rim 22 which, in turn, is frictionally fitted or threadedly coupled to cylinder 8, a battery recharging receptacle 4, pressure relief valve 26, reverse switch 6, motor 2, wire housing 38, and the motor control switch 40.

Figure 24:
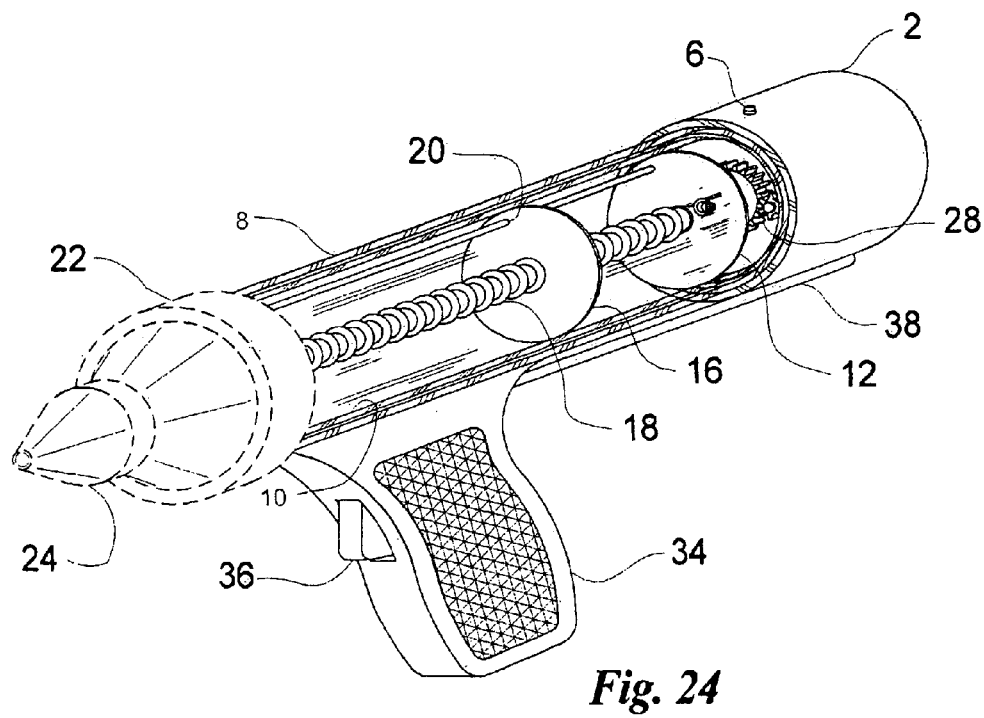
FIG. 24 shows an isometric view of a trigger grip embodiment of the invention.

FIG. 24 shows an isometric view of the trigger grip embodiment of the invention, an alternative to the pencil grip embodiment shown in FIG. 1. This embodiment has a trigger grip handle 34 and a trigger switch 36. The rest of this embodiment is the same as the embodiment shown in FIG. 1 with the same reference numerals.

Figure 25:
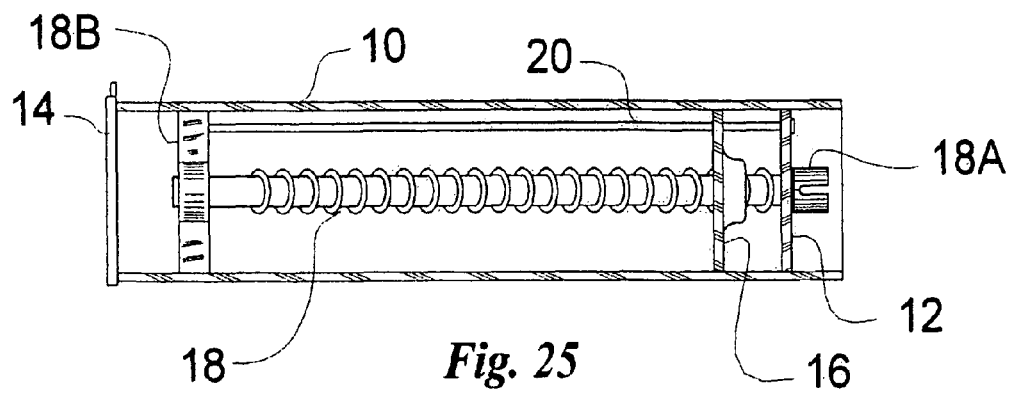
FIG. 25 shows a side view of an embodiment of a portable plastic cartridge of the invention.
Figures 26, 27, 28:
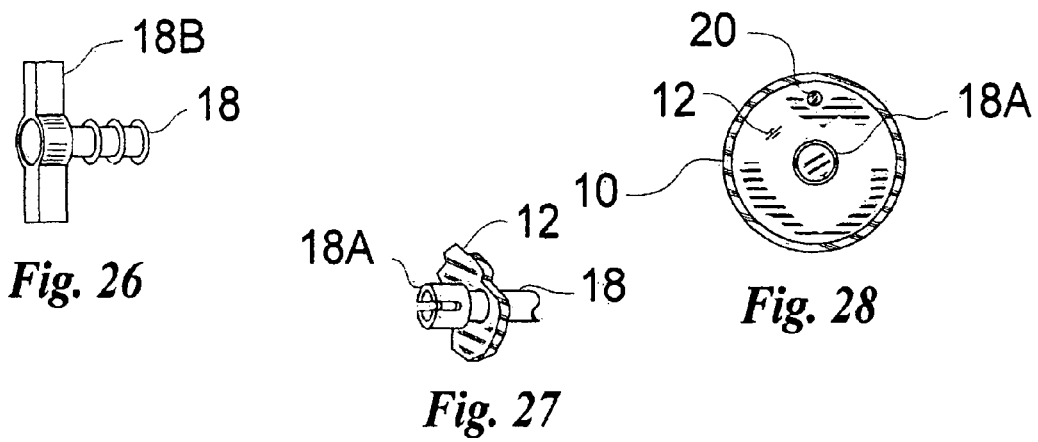
FIG. 26 shows an isometric view of an embodiment of a motor coupling/shaft end support of the invention.
FIG. 27 shows an isometric view of the motor coupling and top inside rim of the cylinder of the invention.
FIG. 28 shows a rear view of the cartridge of the invention.

FIG. 25 shows a side view of a plastic cartridge 10 as shown in FIG. 9. FIG. 26 shows an isometric view of the shaft end support 18B that is situated at a distal end of the screw shaft 18. FIG. 27 shows an isometric view of the motor coupling 18A and top inside rim of the cylinder 12 and screw shaft 18. FIG. 28 shows a rear view of the cartridge 10, with the top inside rim 12, guide rod 20 and motor coupling 18A.

Figures 29, 30, 31:
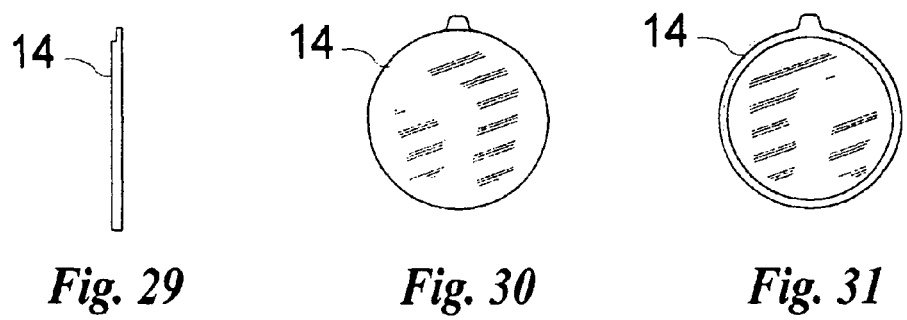
FIG. 29 shows a top view of the end cap of the cartridge of the invention.
FIG. 30 shows a side view of the end cap of the cartridge of the invention.
FIG. 31 shows an inside view of the end cap of the cartridge of the invention.

FIG. 29 shows a top view of the end cap 14 of the cartridge 10, FIG. 30 shows a side view of the end cap 14, and FIG. 31 shows an inside view of the end cap 14. The end cap 14 of the cartridge 10 is used for retaining icing, glue, adhesive, et cetera or other semi-soft material used in the inventions application.

Motor Control System 42

Figure 32:
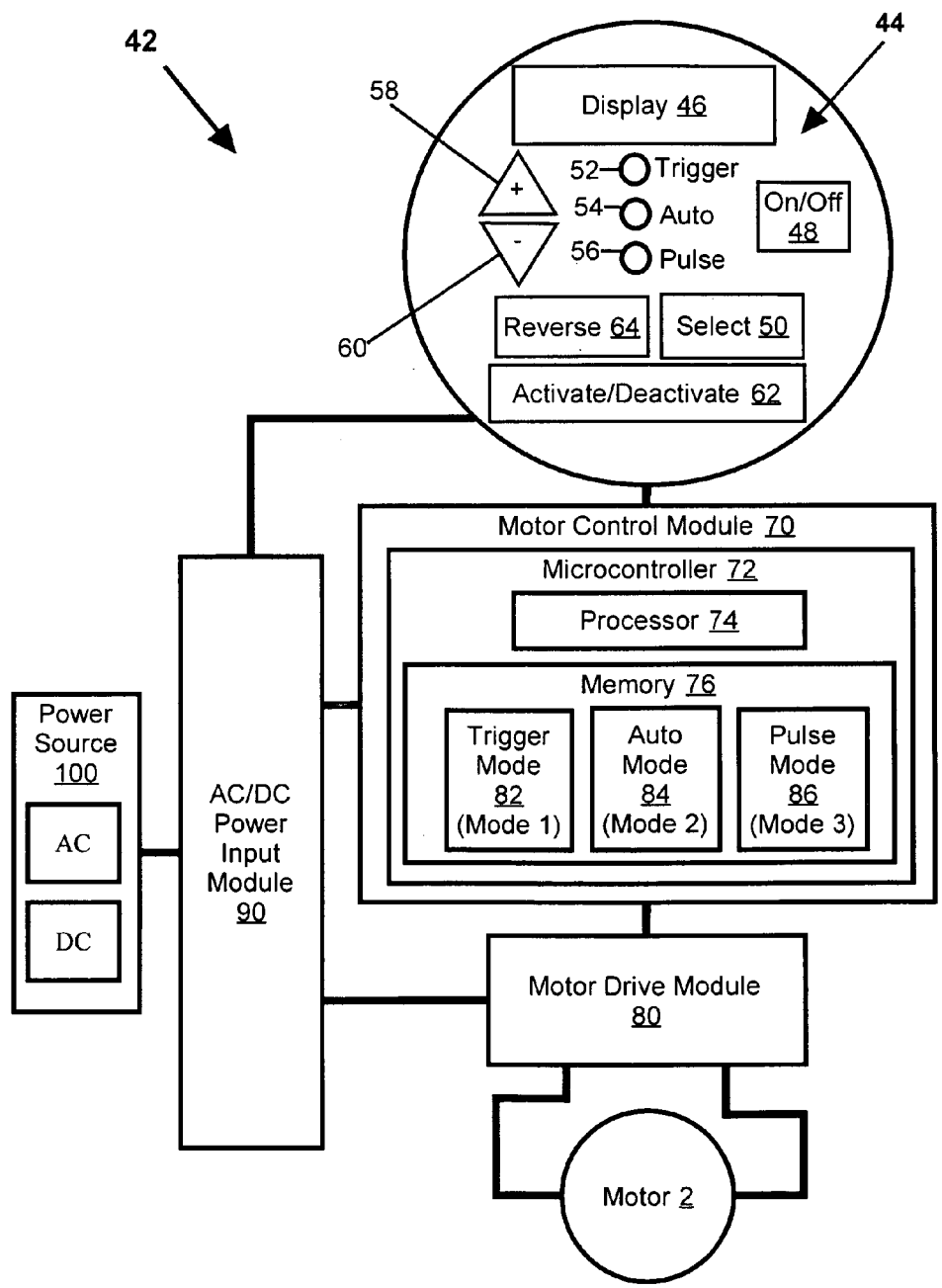
FIG. 32 is an explanatory block diagram showing a schematic configuration of an embodiment of a motor control system for the powered dispenser and showing an enlarged view of a user interface of the motor control system.
Figure 33:
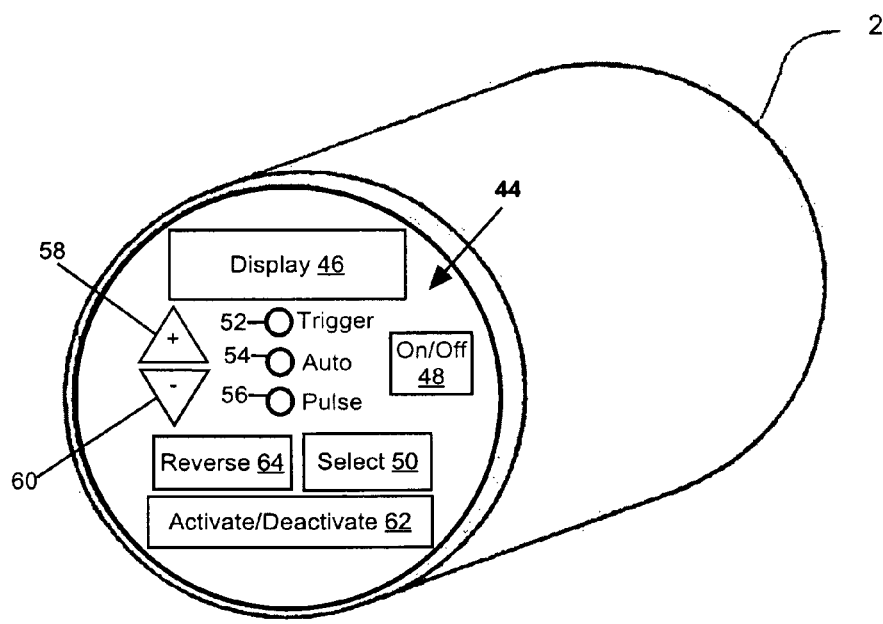
FIG. 33 shows an enlarged isometric view of another embodiment of the rear of the motor showing the user interface of the motor control system.

FIG. 32 is an explanatory block diagram showing a schematic configuration of an embodiment of a motor control system 42 for the powered dispenser and showing an enlarged view of a user interface 44 of the motor control system 42. FIG. 33 shows an enlarged isometric view of an embodiment of the rear of the motor housing supporting the user interface 44 of the motor control system 42.

More specifically, and referring to FIGS. 32 and 33, an embodiment of the invention provides the multi-mode motor control system 42 for controlling the motor 2 as a function of user input. In the illustrated embodiment, the motor control system 42 is comprised of the user interface module 44 disposed on the back end of the housing of the motor 2 in replacement of motor control switch 40 as illustrated in FIG. 33, a motor control module 70 operatively coupled to the user interface module 44, and a motor drive or power module 80 operatively coupled to the control module 70 and motor 2, and a power input module 90 operatively coupled to user interface module 44, the motor control module 70, and the motor drive or power module 80.

In turn, the power input module 90 is operatively coupled to an AC and/or DC power source 100 in the form of, for example, an external electrical outlet and/or an internal battery.

User Interface Module 44

In one embodiment, the user interface module 44 comprises a display 46 for providing user information during a mode selection process and information correlative to the status of selected mode process thereafter.

Additionally, the user interface module 44 comprises an on/off button or switch 48 for turning the powered dispenser on and off, a mode select button or switch 50 for selecting a trigger/switch dispensing control mode or method 82 (mode 1), an auto continuous dispensing control mode or method 84 (mode 2), or a pulse dispensing control mode or method 86 (mode 3).

Furthermore, the user interface module 44 comprises mode status lights in the form of trigger mode LED 52, auto mode LED 54, and pulse mode LED 56 providing a lighted indication of each respectively selected mode.

Moreover, the user interface module 44 comprises an up button or switch 58 and a down button or switch 60 for setting parameters of each respectively selected mode, an activate/deactivate button or switch 62 for activating and deactivating each selected mode, and a reverse button or switch 64 for reversing the motor 2.

Motor Drive Module 80

The motor drive or power module 80 is comprised of motor drive electronics for receiving power from the power input module 90 and driving the motor 2 under the orchestration of the motor control module 70 communicating with the user interface module 44. Drive electronics for an AC or DC type motor will now be evident to those having ordinary skill in the art, informed by the present disclosure.

Motor Control Module 70

In one embodiment, the motor control module 70 comprises a microcontroller 72 having a processor 74 and a non-transitory memory 76 for receiving and storing user selected settings and user parameters from the user interface module 44 and running one or more non-transitory memory stored programs or algorithms implementing the trigger/switch dispensing control mode or method 82 (mode 1), the auto continuous dispensing control mode or method 84 (mode 2), or the pulse dispensing control mode or method 86 (mode 3). Accordingly, and in response to the user selected mode and user selected parameters, the motor control module 70 communicates with the motor drive module 80 for operating/controlling the motor 2 as a function of the user selected mode and settings for dispensing a semi-soft material from the powered dispenser. The motor control module 70 further controls the information displayed on display 46 and the on/off state of each of the LED mode indicators 52, 54, and 56 of the user interface module 44.

In general, and in the trigger dispensing control mode (mode 1), the motor control module 70 controls the starting of the motor 2 in response to the trigger 36 being actuated. Once the trigger 36 is actuated, the motor control module 70 controls the speed of the motor 2 as a function of trigger pressure. When the trigger 36 is released, the motor control module 70 controls the stopping of the motor 2 and then controls the reversing of the motor 2 for a predefined duration for aspirating or drawing the semi-soft material back into the powered dispenser. In another embodiment, a switch may be used in place of trigger 36.

With the auto continuous dispensing control mode (mode 2) selected via the select button 50, the motor control module 70 controls the starting of the motor 2 when the activate/deactivate button 62 is initially pressed by the user and then, the motor control module 70 automatically drives the motor 2 at a continuous speed which is user adjustable after the mode is selected via the up and down buttons 58 and 60 respectively. The power level may also be adjusted by the user incrementally or at predefined levels displayed on display 46 via the use of the up and down buttons 58 and 60 respectively and the select button 50 or via a separate power level button on the interface 44. The motor control module 70 controls the stopping of the motor 2 in response to a subsequent pressing of the activate/deactivate button 62 and then controls the reversing of the motor 2 for a predefined duration for aspirating or drawing the semi-soft material back into the powered dispenser. In another embodiment, pressing and releasing the trigger 36 may be employed for activating and deactivating the auto continuous dispensing control mode (mode 2).

Accordingly, the auto continuous dispensing control mode (mode 2) provides a continuous flow rate of semi-soft material from the powered dispenser and the flow rate can be incrementally or continuously adjusted by the user utilizing the up button 58 to increase the continuous flow rate or the down button 60 to decrease the continuous flow rate until the user desired continuous flow rate is achieved. For example, when caulking a bathtub once the user determines a proper flow rate all the user would have to do is move the powered dispenser at the appropriate speed. The auto continuous dispensing control mode (mode 2) is also advantageous for some food (e.g., cake, cookies, pastries, et cetera) decorating applications such as string work and writing.

In the pulse dispensing control mode (mode 3) the motor control module 70 controls the cycling of the motor 2 between an on and off state. During this cycling, the motor control module 70 controls the amount of time the motor 2 is in the on state and the amount of time the motor 2 is in the off state. This cycling can be activated and deactivated with the activate/deactivate button 62. When deactivated, the motor control module 70 controls the reversing of the motor 2 for a predefined duration for aspirating or drawing the semi-soft material back into the powered dispenser. In another embodiment, pressing and releasing the trigger 36 may be employed for activating and deactivating the pulse dispensing control mode (mode 3) or, in other words, the on and off cycling of the motor 2.

Accordingly, the pulse dispensing control mode (mode 3) provides a pulsed semi-soft material flow rate wherein the pulse rate (on and/or off time) is user adjustable by the user interfacing with the display 46 to control pulse on time and a cycle time, a pulse off time and cycle time, or pulse on and off times for defining the time the motor is on and off during each cycle for dispensing the semi-soft material intermittently.

In one embodiment, each cycle may also be programmed with a reverse motor time after each on time wherein the reverse motor time may be a portion of or all of the off time.

In another embodiment, the motor control module 70 may be user adjusted to provide different pulse rates in a series of cycles. In use and operation, the pulse dispensing control mode (mode 3) provides an adjustable intermittent setting that controls the motor to run for the period of time determined by the user, stop, run, stop, et cetera for decorating foods.

For example, when doing a shell border on a cake, a pastry bag is generally utilized by increasing and decreasing pressure on the bag (squeeze, release, squeeze, release) as the cake is turned. With the pulse dispensing control mode (mode 3) of the powered dispenser, the user simply adjust the intermittent flow rate to run the motor for the period of time determined by the user, stop, run, stop, et cetera for providing the user with a much more consistent shell border than if done with a manual decorator or a decorator without the pulse mode feature. Hence, the power dispenser allows the user to employ the pulse mode 76 and simply set it to the proper timing and then can focus just on moving the tip of the power dispenser around the cake or other food item.

In one embodiment, the pulse rate can be set by the user utilizing the up button 58 to increase the on and/or off times or by utilizing the down button 60 to decrease the on and/or off times as desired. For example, and in one embodiment, the display 46 can display the percentage of time of flow for every cycle.

For example, a displayed numerical value indicates a percentage of the duty cycle. That is, the on time is the displayed numerical percentage of every cycle or period which means that flow of the semi-soft material from the powered dispenser occurs for the displayed numerical percentage of the time of each cycle. The up button 58 and the down button 60 allow the user to increase or decrease the time of each cycle and the percentage of time the semi-soft material flows for each cycle.

For example, if the user selects a twenty second cycle or period and a ten percent duty cycle and the user wanted to increase the percentage of time to a twenty percent duty cycle the user would push button 58 until the display 46 shows 20. The motor 2 would then have a twenty percent or a four second on time for each twenty second cycle.

Thus, through the user interface module 44 the cycle or period time and the percentage of on time (duty cycle) of the motor 2 during that cycle or period can be adjusted by the user to increase or decrease the intermittent flow rate of dispensed semi-soft material onto or into a food item.

In another embodiment, the user can start the flow utilizing the trigger mode 82 or auto continuous mode 84 as they normally would and then select the pulse or intermittent flow mode 86 and adjust the length of time the motor pauses by hitting the plus button to increase the length of time the motor pauses or the minus button to decrease the length of time the motor pauses.

In a further embodiment, there can be several preset/preprogrammed auto continuous flow rates and power levels and several preset/preprogrammed pulse rates that are standard and that are adjustable by the user by employing the plus or minus buttons 58, 60 respectively.

Moreover, and in one embodiment, the above noted auto reverse feature for aspirating or drawing the semi-soft material back into the powered dispenser for abating or precluding the semi-soft material from continuing to flow from the tip is optional for each of the three above delineated modes of operation.

Power Input Module 90

In one embodiment, the power input module 90 is electrically coupled to the AC and/or DC power source 100 via the manual on/off switch 48 for allowing the power input module 90 to receive power from the power source 100 when the on/off switch 48 is in the on position and for interrupting power from the power source 100 when the on/off switch 48 is in the off position. The power received by the power input module 90 is, in turn, converted to a form that provides the voltage and current requirements or, in other words, the power requirements to the user interface module 44, the control module 70, and the motor drive or power module 80.

Multi-Mode Control Process/Method

Figure 34:
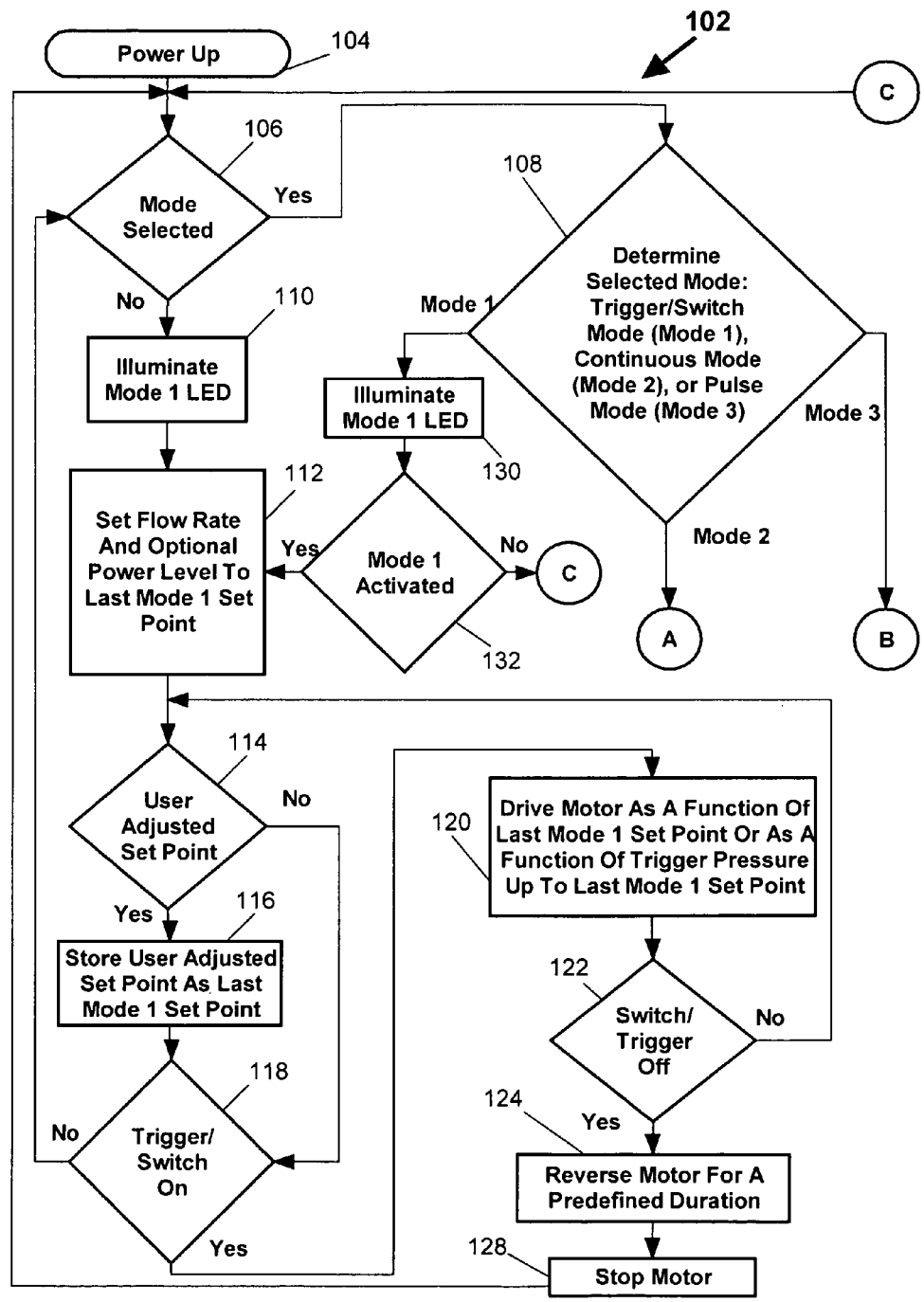
FIGS. 34 through 36 are flowchart views that detail an embodiment of a multi-mode motor control process of the control system of the invention.
Figure 35:
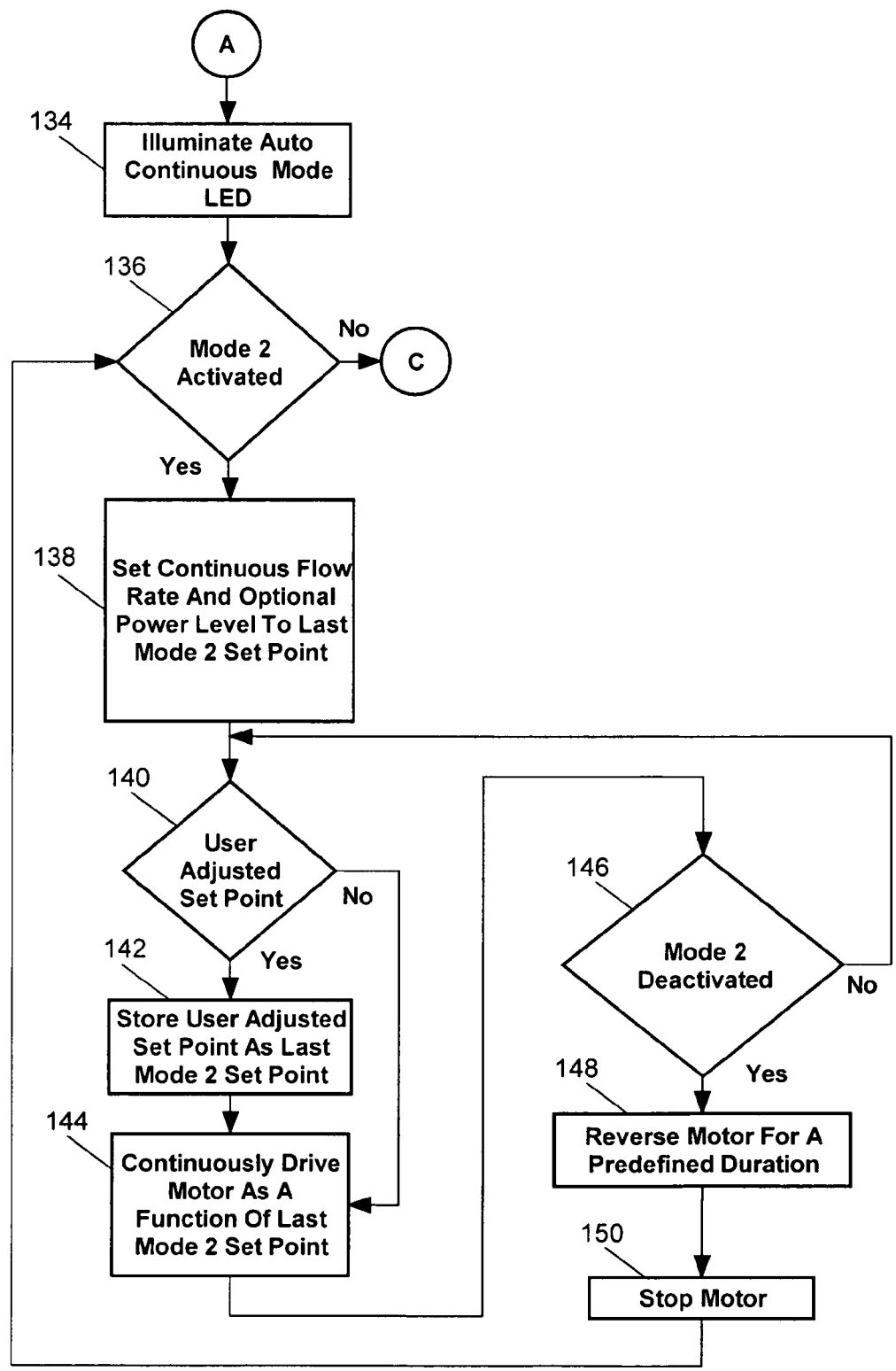
Figure 36:
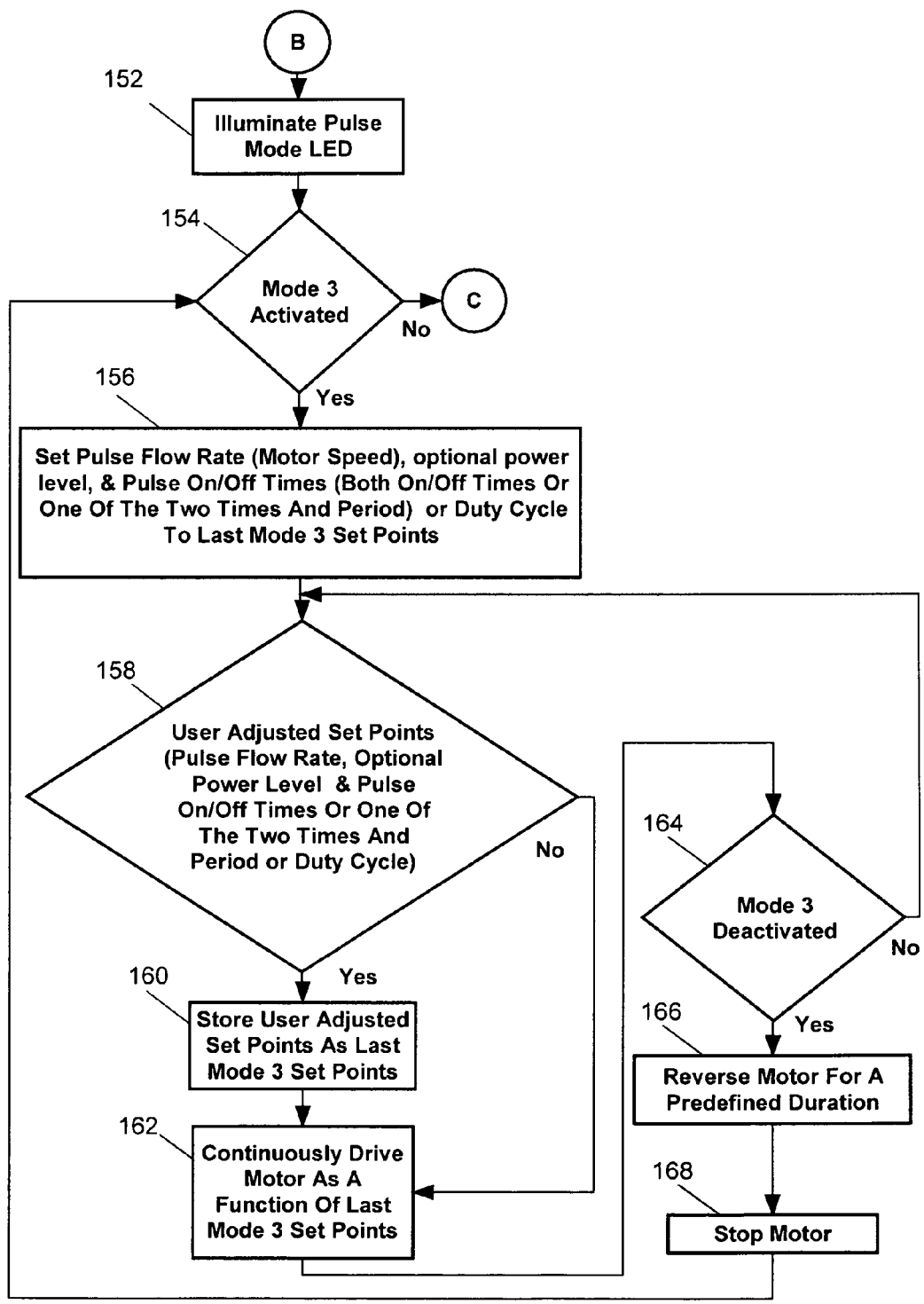

FIGS. 34 through 36 are flowchart views that detail an embodiment of a multi-mode motor control process 102 of the motor control system 42 of the powered dispenser.

The multi-mode control process 102 is comprised of coded instructions that are stored in the non-transitory memory 76 of the microcontroller 72 and that are illustrated in flowchart form in FIGS. 34 through 36. In one embodiment, the program memory is a non-transitory microcontroller-readable medium such as non-volatile flash memory that stores coded instructions embodying or utilized by any one or more of the processes or methods described herein. The coded instructions may also reside, completely or at least partially, within a RAM memory and/or within a processor 76 during execution thereof by the microcontroller 72 wherein the RAM memory and the processor also constitute non-transitory microcontroller-readable media. The non-transitory memory 76 of the microcontroller 72 can also comprise data memory such as a non-volatile EEPROM for storing static or working data, look-up tables, profiles, or curves.

Referring to FIGS. 32 and 34, and at the outset, the multi-mode control process 102 begins with a power up signal 104 initiated by, for example, pushing the on/off button 48 of the user interface module 44 resulting in the microcontroller 72 receiving power and initializing communication with the user interface module 44 and the motor drive module 80. Next, the multi-mode control process 102 proceeds to decision block 106 for determining if a mode select command has been given via the select button 50 of the user interface module 44. The process flow reflecting a no answer to this decision will be delineated directly below with the process flow reflecting a yes answer to this decision following directly thereafter.

Hence, if the answer to decision block 106 is no as a result of, for example, a mode select command not being received from the user after a preset time limit, the process defaults to the Trigger/Switch Dispensing Control Mode (Mode 1) and proceeds to process block 110 for illuminating the mode 1 or Trigger LED 52. Then, the process flows from process block 110 to process block 112 wherein the flow rate and optionally the power level is adjusted or set to the last mode 1 set point (motor speed/flow rate and optional power level). Then, the process flows from process block 112 to decision block 114 for determining if the user has or is adjusting the motor speed/flow rate and optionally the power level to a new set point and if yes, the process flows from decision block 114 to process block 116 for storing the new user adjusted set point as the last Mode 1 set point and then onto decision block 118. Alternatively, if the result of decision block 114 is no, then the process bypasses process block 116 and flows to decision block 118. Decision block 118 determines if the trigger 36 or a switch has been actuated or is on and if no, the process loops back to and continues at decision block 106 and if yes, the process flows to process block 120. At process block 120, the motor 2 is driven as a function of the last Mode 1 set point or as a function of trigger pressure up to the last Mode 1 set point. Next, the process flows from process block 120 to decision block 122 for determining if the trigger 36 or the switch has been released or is off and if no, the process loops back to and continues at decision block 114 and if yes, the process flows to process block 124. At process block 124, the motor 2 is driven in reverse for a predefined duration as delineated above. Then, the process stops the motor at process block 128 and loops back to and continues at decision block 106.

Alternatively, if the answer to decision block 106 is yes instead of no as delineated above, the process flow proceeds to decision block 108 for determining which mode, the Trigger/Switch Dispensing Control Mode (Mode 1), the Auto Continuous Dispensing Control Mode (Mode 2), or the Pulse Dispensing Control Mode (Mode 3), has been selected for processing.

If the Trigger/Switch Dispensing Control Mode (Mode 1) is determined to have been selected by decision block 108, then the process flow will proceed to process block 130 for illuminating the mode 1 or Trigger LED 52. Then, the process flows from process block 130 to decision block 132 for determining if the user has activated the Trigger/Switch Dispensing Control Mode (Mode 1) and if yes, the process flows from decision block 132 to process block 112 and the Trigger/Switch Dispensing Control Mode (Mode 1) process proceeds as delineated above. Alternatively, if the result of decision block 132 is no, then the process loops back to and continues at decision block 106.

If the Auto Continuous Dispensing Control Mode (Mode 2) is determined to have been selected by decision block 108, then the process will proceed to the process flow illustrated in FIG. 35 which begins with process block 134 for illuminating the mode 2 or Auto Continuous Mode LED 54 illustrated in FIG. 32. Then, the process flows from process block 134 to decision block 136 for determining if the user has activated the Auto Continuous Dispensing Control Mode (Mode 2) via the activate/deactivate button or switch 62 and if no, the process loops back to and continues at decision block 106. Alternatively, if the result of decision block 136 is yes, the process flows to process block 138 wherein the auto continuous flow rate is set to the last Mode 2 set point (motor speed/flow rate and optional power level). Then, the process flows from process block 138 to decision block 140 for determining if the user has or is adjusting the motor speed/flow rate and optional power level via the up and down buttons 58 and 60 to a new set point and if yes, the process flows from decision block 140 to process block 142 for storing the new user adjusted set point as the last Mode 2 set point and then onto process block 144. Alternatively, if the result of decision block 140 is no, then the process bypasses process block 142 and flows to process block 144. At process block 144, the motor 2 is continuously driven as a function of the last Mode 2 set point. Next, the process flows from process block 144 to decision block 146 while the motor is being continuously driven for determining deactivation of Mode 2 via the activate/deactivate button or switch 62 and if no, the process loops back to and continues at decision block 140 and if yes, the process flows to process block 148. At process block 148, the motor 2 is driven in reverse for a predefined duration as delineated above. Then, the process stops the motor at process block 150 and loops back to and continues at decision block 136.

If the Pulse Dispensing Control Mode (Mode 3) is determined to have been selected by decision block 108, then the process will proceed to the process flow illustrated in FIG. 36 which begins with process block 152 for illuminating the mode 3 or Pulse Mode LED 56 illustrated in FIG. 32. Then, the process flows from process block 152 to decision block 154 for determining if the user has activated the Pulse Mode (Mode 3) via the activate/deactivate button or switch 62 and if no, the process loops back to and continues at decision block 106. Alternatively, if the result of decision block 154 is yes, the process flows to process block 156 wherein, for example, the duty cycle, the motor speed/flow rate, and the optional power level is set to the last Mode 3 set point. Then, the process flows from process block 156 to decision block 158 for determining if the user has or is adjusting the motor speed/flow rate, the optional power level, and, for example, the duty cycle via the up and down buttons 58 and 60 to define new set points and if yes, the process flows from decision block 158 to process block 160 for storing the new user adjusted set points as the last Mode 3 set points and then onto process block 162. Alternatively, if the result of decision block 158 is no, then the process bypasses process block 160 and flows directly to process block 162. At process block 162, the motor 2 is intermittently driven as a function of the last Mode 3 set points. Next, the process flows from process block 162 to decision block 164 while the motor is being intermittently driven for determining deactivation of Mode 3 via the activate/deactivate button or switch 62 and if this decision is no, the process loops back to and continues at decision block 158 and if yes, the process flows to process block 166. At process block 166, the motor 2 is driven in reverse for a predefined duration as delineated above. Then, the process stops the motor at process block 168 and loops back to and continues at decision block 154.

It will be apparent to those skilled in the art that various modifications and variations can be made to the structure of the present invention without departing from the scope or the spirit of the invention. In view of the foregoing, it is intended that the present invention cover modifications and variations of this invention provided they fall within the scope of the following claims and their equivalents.

I claim:

1. A powered dispenser for dispensing semi-soft materials, said powered dispenser comprising:
    a barrel with an interchangeable tip coupler on one end and a motor at the other end;
    a replaceable cartridge sized to be received within said barrel and to contain a semi-soft material to be dispensed;
    a threaded rod disposed inside said replaceable cartridge and connected to said motor;
    a plunger disposed inside said replaceable cartridge and mounted on said threaded rod wherein said plunger is driven along said threaded rod in an up or down direction through said replaceable cartridge depending on a direction that said motor turns said threaded rod;
    means for preventing said plunger from turning freely inside said replaceable cartridge, and
    a multi-mode motor control system for driving said motor as a function of a user selected dispensing control mode.

2. The powered dispenser of claim 1 wherein said multi-mode motor control system comprises a user interface comprising means for selecting between a plurality of different user selected dispensing control modes.

3. The powered dispenser of claim 2 wherein said multi-mode motor control system comprises a controller operatively coupled to said motor and connected in signal communication with said user interface, said controller being configured to drive said motor for turning said threaded rod for driving said plunger in a first direction for dispensing said semi-soft material in response to a user selected one of said plurality of different user selected dispensing control modes.

4. The powered dispenser of claim 2 wherein said plurality of different user selected dispensing control modes comprises a trigger actuated dispensing control mode.

5. The powered dispenser of claim 2 wherein said plurality of different user selected dispensing control modes comprises an auto continuous dispensing control mode.

6. The powered dispenser of claim 2 wherein said plurality of different user selected dispensing control modes comprises a pulsed dispensing control mode.

7. The powered dispenser of claim 2 wherein said plurality of different user selected dispensing control modes comprises a trigger actuated dispensing control mode, an auto continuous dispensing control mode, and a pulsed dispensing control mode.

8. The powered dispenser of claim 1 wherein said powered dispenser is battery powered.

9. The powered dispenser of claim 1 wherein said powered dispenser comprises a pistol grip.

* * * * *